(12) United States Patent
Kikuchi et al.

(10) Patent No.: US 6,646,021 B2
(45) Date of Patent: Nov. 11, 2003

(54) GOLF BALL PRINTING INK, GOLF BALL BEARING A MARK PRINTED WITH THE INK, AND METHOD OF MANUFACTURING THE GOLF BALL

(75) Inventors: Masaaki Kikuchi, Kobe (JP); Hiroaki Tanaka, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 0 days.

(21) Appl. No.: 09/946,537

(22) Filed: Sep. 6, 2001

(65) Prior Publication Data

US 2002/0055397 A1 May 9, 2002

(30) Foreign Application Priority Data

Sep. 8, 2000 (JP) ........................................ 2000-272851

(51) Int. Cl.$^7$ ............................ A63B 37/00; C09D 11/02
(52) U.S. Cl. .............................. 522/74; 522/79; 522/80; 522/83; 522/96; 522/103; 522/107; 473/351
(58) Field of Search ................................ 522/71, 74, 75, 522/76, 77, 78, 79, 80, 81, 82, 83, 84, 85, 86, 96, 103, 107; 523/300, 160; 473/351

(56) References Cited

U.S. PATENT DOCUMENTS

| 5,778,793 | A | * | 7/1998 | Mello et al. ................ 101/494 |
|---|---|---|---|---|
| 5,827,134 | A | * | 10/1998 | Sullivan et al. ............. 473/372 |
| 5,885,173 | A | * | 3/1999 | Keller ........................ 473/385 |
| 6,001,898 | A | * | 12/1999 | Lutz ............................ 523/160 |
| 6,013,330 | A | * | 1/2000 | Lutz ............................ 427/511 |
| 6,099,415 | A | | 8/2000 | Lutz |
| 6,149,983 | A | * | 11/2000 | Keller ........................ 427/511 |
| 6,179,730 | B1 | * | 1/2001 | Keller et al. ................ 473/371 |
| 6,314,880 | B1 | * | 11/2001 | Lampinski .................. 101/170 |
| 2002/0037777 | A1 | * | 3/2002 | Isogawa ..................... 473/351 |

\* cited by examiner

*Primary Examiner*—Susan W. Berman
(74) *Attorney, Agent, or Firm*—Birch, Stewart, Kolasch & Birch, LLP

(57) ABSTRACT

A golf ball printing ink is provided which ensures a sufficient pot life, requires a shortened drying time after printing, and yields a mark having a clear appearance and superior durability. Also provided are a printing method using the ink, a golf ball bearing a mark printed with the ink, and a method of manufacturing a golf ball. The golf ball printing ink includes a solvent, a resin in a solid state at ordinary temperature or a reactive curing resin which is curable through reaction with a curing agent, and an ultraviolet-curing resin. The method of manufacturing a golf ball includes the steps of: printing a mark on a surface of a golf ball body with use of the ink; irradiating the mark with ultraviolet ray after the printing; and applying a clear paint to the golf ball body after the ultraviolet ray irradiation.

27 Claims, No Drawings

GOLF BALL PRINTING INK, GOLF BALL BEARING A MARK PRINTED WITH THE INK, AND METHOD OF MANUFACTURING THE GOLF BALL

BACKGROUND OF THE INVENTION

1. Field of the Invention

The present invention relates to a golf ball printing ink which is capable of printing marks having superior impact resistance with higher productivity, to a golf ball bearing a mark printed with this ink, and to a method of manufacturing such a golf ball.

2. Description of the Related Art

Golf balls bear letters, patterns and symbols representing trade names, numbers, brand names and the like (hereinafter referred generally to as "mark(s)") printed on surfaces thereof.

Golf balls are subject to heavy deformations due to hitting with golf clubs and, hence, repeated shots may cause the mark printed on a golf ball body to peel off the ball body, or to crack or chip off because the mark cannot follow such deformations of the golf ball. For this reason, demands exist for inks capable of printing highly impact-resistant marks that will not peel off or chip off when subjected to repeated shots with golf clubs.

In printing a mark on a spherical surface formed with a multiplicity of dimples such as a golf ball surface, a screen printing process is difficult and, accordingly, it is a common practice to employ a pad printing process wherein an ink filling an cavity of a printing plate is transferred onto a pad and the ink on the pad is transferred onto a golf ball body surface.

Examples of conventional inks for use in such a pad printing process include inks of the evaporation to dryness type which comprises a solution prepared by dissolving a solid resin in a solvent and which dries after printing due to evaporation of the solvent; and inks of the two-part reactive type comprising a base resin and a curing agent, which are mixed together before filling the cavity of a printing plate, the mixture in the cavity being then transferred to a ball body surface and allowed to cure on the ball body surface.

With such a two-part reactive type ink, it is required that the base resin and the curing agent be mixed together every printing one lot of balls because the curing reaction therebetween starts proceeding upon their mixing and results in an increase of the viscosity of the ink. In order to maintain the fluidity of the ink at such a degree as to allow the ink to fill the cavity of a printing plate until one lot printing has been completed, the ink composition should be adjusted so that it takes about half a day or one whole day for the curing reaction thereof to complete. This, however, means that a drying process to be performed between the completion of printing on a ball body surface and the subsequent application of the whole ball body surface with a clear paint also takes half a day or one whole day. During the period up to the completion of curing, balls thus printed need to be left stationary so as not to contact each other. This has been an obstacle in improving the productivity.

With respect to an evaporation to dryness type ink, the drying time thereof is equal to the evaporation time of the solvent and, hence, obstacles in improving the productivity can be reduced by selecting a suitable kind of solvent. However, marks printed with such evaporation to dryness type inks generally have inferior impact resistance. For this reason, a reinforcing agent is usually added to such an evaporation to dryness type ink to improve the impact resistance of resulting marks.

An ink containing reinforcing agents, however, has a shortened pot life and, hence, it is difficult to ensure pot life and impact resistance in a well-balanced manner.

In general, it takes several days for a printed mark to cure completely at ordinary temperature and, hence, it is a common practice to perform a clear paint applying process when the mark has dried to such a state that the ink forming the mark does not transfer to a hand touching the mark.

The clear paint used here is a paint comprising a film forming resin and a solvent dissolving the resin. Since the solvent in the clear paint is same as or analogous to the solvent used in the ink, the solvent of the clear paint may dissolve an uncured portion of a printed mark or penetrates into such an uncured portion to cause the mark to swell when the curing of the mark has not been fully completed. This results in the mark having an impaired appearance and a lower durability.

An ultraviolet-curing type ink is an ink that is capable of ensuring a sufficient pot life before printing while offering a rapid drying. However, such ultraviolet-curing type inks, in general, do not contain any organic solvent and hence have higher viscosity. For this reason, it is difficult for such an ultraviolet-curing type ink to transfer from a printing pad to a ball body surface without any chipping.

Japanese Patent Laid-Open Gazette No. HEI 9-122271 discloses an ink which is suitable for pad printing process and capable of printing highly impact-resistant marks while taking advantages of the ultraviolet-curing type inks. The viscosity of the ink composition of this ink is a specified, and the Sward hardness of the film formed with the cured ink is also specified.

This ink, however, yields marks having inferior durability and hence is unsatisfactory as a golf ball printing ink.

SUMMARY OF THE INVENTION

An object of the present invention is to provide a golf ball printing ink which is capable of printing a mark having a clear appearance and superior impact resistance with a shortened drying time required after the printing while ensuring a sufficient pot life, a golf ball bearing a mark printed with the ink, and a method of manufacturing the golf ball.

A golf ball printing ink according to one aspect of the invention comprises a solvent, a resin in a solid state at ordinary temperature, and an ultraviolet-curing type resin. A golf ball printing ink according to another aspect of the invention comprises a solvent, a curing agent, a reactive curing type resin which is curable through reaction with the resin, and an ultraviolet-curing type resin.

A method of manufacturing a golf ball of the present invention comprises the steps of printing a mark on a surface of a golf ball body with use of either of the inventive inks; irradiating the mark with ultraviolet ray after the printing; and applying a clear paint to the golf ball body after the ultraviolet ray irradiation.

A golf ball of the invention comprises a ball body, a mark printed on a surface of the ball body with use of either of the inventive ink, and a clear coating film covering a surface of the ball body and the mark.

The foregoing and other objects, features and attendant advantages of the present invention will become apparent from the reading of the following detailed description.

DETAILED DESCRIPTION OF THE PREFERRED EMBODIMENTS

The present invention will now be described in detail.

A golf ball printing ink according to a first aspect of the present invention comprises a resin in a solid state at ordinary temperature (hereinafter referred to as "solid resin" simply), an ultraviolet-curing type resin, and a solvent.

Conventionally known resins used as vehicles in ink which is dryable by evaporation of the solvent therein can be used as the solid resin. Examples of the solid resins include cellulose derivatives such as nitrocellulose, acetylcellulose, ethylcellulose, and cellulose acetate butyrate; synthetic resins such as acrylic resin, alkyd resin, vinyl resin, and urethane resin; and rubbers such as chlorinated rubber. These resins can be dissolved in solvents to be described later and hence can be present in a liquid state in the ink.

The ultraviolet-curing type resin used in the present invention is three-dimensionally crosslinked by reactions initiated by radicals produced by irradiation of ultraviolet ray (in the wavelength range of 250 to 450 nm). The ultraviolet-curing type resin contains an ultraviolet-curing type polymer having unsaturated bonds (vinyl group or acryloyl group) causing radical polymerization. Preferably, the resin further contains a radical-polymerizable monomer. Such an ultraviolet-curing type resin becomes a cured state where the crosslinking reaction has been completed when irradiated with ultraviolet ray for a short time. Accordingly, the ink of the present invention can yield marks having superior solvent resistance that do not need to be left stationary over day and night unlike the conventional inks.

Examples of the ultraviolet-curing type resins include unsaturated polyesters, alkyd resins, epoxy resins having a (meth)acryloyl group introduced at the terminal of a molecule thereof ((meth)acryloyl-containing epoxy resins), and polyurethanes having a (meth)acryloyl group introduced at the terminal of a molecule thereof ((meth)acryloyl-containing polyurethanes). Among these resins, (meth)acryloyl-containing polyurethanes are preferred. Such a resin containing an acryloyl group or a methacryloyl group is less subject to air hindrance during curing and hence is curable in a shorter time. Further, such a (meth)acryloyl-containing resin is preferable because the (meth)acryloyl group has affinity with a carboxyl-containing resin such as an ionomer and, hence, the (meth)acryloyl-containing resin exhibits better adhesion to a ball body surface formed of a material containing an ionomer.

Examples of useful radical-polymerizable monomers include vinyl compounds such as styrene; and unsaturated monobasic acids such as acrylic acid, methacrylic acid, crotonic acid, and cinnamic acid. These radical-polymerizable monomers react with the ultraviolet-curing type polymer to promote the crosslinking reaction.

Usable as the solvent are organic solvents that can dissolve the solid resin, specifically, conventionally known organic solvents for use as solvents in evaporation to dryness type inks. Examples of specific solvents include ketones such as cyclohexanone, and methyl ethyl ketone; esters such as propylene glycol monomethyl ether acetate, 3-methoxy-3-methylbutyl acetate, cellosolve acetate, and carbitol acetate; aromatic hydrocarbons such as benzene, toluene, and xylene; ethers such as dioxane, tetrahydrofuran, and ethylene glycol; cellosolves such as cellosolve and butyl cellosolve; and carbitols such as carbitol and butyl carbitol. An appropriate one of these solvents is selected depending on the kind of solid resin. The content of the solvent in the ink is preferably selected depending on the content of the solid resin. The foregoing solvents may be used either alone or as a mixture of two or more of them.

The mixing ratio of the solid resin to the ultraviolet-curing type resin (solid resin/ultraviolet-curing type resin) is not less than 1/1, preferably 2/1. The upper limit of the mixing ratio is 10/1, preferably 8/1. If the mixing ratio is less than 1/1, stated otherwise, if the proportion of the solid resin is smaller than required, the proportion of the ultraviolet-curing type resin is too large and, hence, the resulting ink will yield marks having lowered durability. If the mixing ratio is more than 10/1, stated otherwise, if the proportion of the solid resin is larger than required, it takes a longer time for the ink to cure due to the ultraviolet-curing type resin used in a small proportion relative to the solid resin and, hence, a resulting mark may be blurred when a clear paint is applied after irradiation of ultraviolet ray according to the manufacturing method of the present invention to be described later, thus marring the appearance of the mark. To prevent the mark from blurring, it is necessary to provide a longer drying time between the mark printing process and the clear paint applying process, resulting in no improvement in the productivity.

The mixing of the solid resin and the ultraviolet-curing type resin is preferably performed just before the printing process. This is because if the solid resin contains a functional group (hydroxyl group or the like), the functional group may react with a functional group (for example, epoxy group or acryloyl group) contained in the ultraviolet-curing type resin.

Preferably, the ink according to the present invention contains a photopolymerization initiator in addition to the foregoing indispensable components (solid resin, ultraviolet-curing type resin and solvent). Such a photopolymerization initiator is capable of raising the curing efficiency of the ultraviolet-curing type resin under irradiation of ultraviolet ray.

Examples of such photopolymerization initiators include benzoin and its alkyl ethers such as benzoin, benzoin methyl ether, and benzoin ethyl ether; acetophenones such as acetophenone, 2,2-dimethoxy-2-phenylacetophenone, and 1,1-dichloroacetophenone; anthraquinones such as 2-methylanthraquinone, 2-amylanthraquinone, 2-t-butylanthraquinone, and 1-chloroanthraquinone; thioxanthones such as 2,4-dimethylthioxanthone, 2,4-diisopropylthioxanthone, and 2-chlorothioxanthone; ketals such as acetophenonedimethylketal and benzyldimethylketal; benzophenones such as benzophenone; 2-methyl-1-[4-(methylthio)phenyl]-2-morpholino-propane-1-one and 2-benzyl-2- dimethylamino-1-(4-morpholinophenyl)-butanone-1; acylphosphine oxides and xanthones; and complexes of diazonium and Lewis acids. A suitable one of these photopolymerization initiators is selected depending on the kind of ultraviolet-curing agent used.

The ink of the present invention may further contain a reinforcing agent to yield marks having enhanced durability. As used herein, the "reinforcing agent" is capable of crosslinking reaction with the solid resin. A suitable reinforcing agent is selected depending on the kind of solid resin used. In the case where the solid resin has, for example, a hydroxyl group, an isocyanate compound is selected as the reinforcing agent.

As the need arises, the ink according to the first aspect of the present invention may further contain an ultraviolet absorber, a light stabilizer, a slip agent, a fluorescent brightner, or the like.

The ink according to the first aspect of the present invention may be prepared by mixing the foregoing ingredients individually or by mixing a commercially-available ink of the evaporation to dryness type and a commercially-available ink of the ultraviolet curing type at an appropriate ratio and adding optional additives to the mixture as required.

A golf ball printing ink according to a second aspect of the present invention comprises a reactive curing type resin, a curing agent, an ultraviolet-curing type resin, and a solvent.

The "reactive curing type resin" as used herein is a conventional one which has been used as a vehicle in two-part reactive type inks. Examples of the reactive curing type resins include urethane resins, epoxy resins, aminoalkyd resins, and aminoacrylic resins. Among them, urethane resins are preferably used because a coating film having a urethane bond is rich in flexibility as compared with other three-dimensionally crosslinked coating films and hence can follow deformations of the golf ball caused by shots thereby suppressing the occurrence of mark chipping or the like.

The reactive curing type resin comprises two components, namely, a base resin and a curing agent. In the case of, for example, a urethane resin, a polyol and an isocyanate are used as the base resin and the curing agent, respectively.

Any polyisocyanate compound having two or more isocyanate groups can be used as the polyisocyanate compound without any particular limitation. Examples of such polyisocyanate compounds include aliphatic, alicyclic, aromatic, or aromatic aliphatic diisocyanate compounds such as hexamethylene diisocyanate (HDI), xylylene diisocyanate (XDI), hydrogenated xylylene diisocyanate ($H_6$XDI), isophorone diisocyanate (IPDI), tetramethylxylylene diisocyanate (TMXDI), and hydrogenated diphenylmethane diisocyanate ($H_{12}$MDI). Among these compounds, non-yellowing polyisocyanates (aliphatic or alicyclic polyisocyanates) are preferably used.

Any polyol having a plurality of hydroxyl groups may be used in the present invention regardless of whether it is a low-molecular-weight compound or a high-molecular-weight compound. Examples of such low-molecular-weight polyols include diols such as ethylene glycol, diethylene glycol, triethylene glycol, butylene glycol, 1,3-butanediol, 1,4-butanediol, neopentyl glycol, and 1,6-hexanediol; and triols such as glycerin, trimethylolpropane, and hexanetriol. Examples of high-molecular-weight polyols include polyether polyols generally resulting from the reaction between an initiator having an active hydrogen atom and alkylene oxide; condensed polyester polyols generally resulting from the dehydro-condensation between a dibasic acid such as adipic acid and a glycol or a triol; lactone polyester polyols generally resulting from ring opening polymerization of a lactam such as $\epsilon$-caprolactam; polycarbonate diols generally synthesized using a cyclic diol; and polymer polyols such as an acrylic polyol prepared by introducing an appropriate hydroxyl group into an acrylic copolymer. Examples of such polyether polyols include polyethylene glycol, polypropylene glycol, and polytetramethylene glycol. Examples of such condensed polyester polyols include polyethylene adipate. Examples of such lactone polyester polyols include poly-$\epsilon$-caprolactone. Among them, polyether polyols are preferably used because a coating film rich in ether bond is flexible and hence can follow deformations of the ball body easily.

Such polyol and polyisocyanate are preferably used so that the equivalent weight ratio between the isocyanate and the hydroxyl group (NCO:OH) assumes 0.8:1 to 1.4:1. Preferably, they are mixed together just before printing. This is because the curing reaction between the polyol and the polyisocyanate starts upon their mixing and, hence, if a relatively long time has elapsed from the mixing, printing has to be performed with an ink that has already become polyurethane due to the proceeding of the curing reaction, resulting in a mark having insufficient adhesion to the ball body.

As the ultraviolet-curing type resin used in the ink according to the second aspect of the present invention, it is possible to use the aforementioned ultraviolet-curing type resins for use in the ink according to the first aspect of the present invention. Also, as the solvent used in the ink according to the second aspect of the invention, it is possible to select a suitable solvent from the solvents exemplified for the ink according to the first aspect of the invention depending on the kind of reactive curing type resin used.

The reactive curing type resin and the ultraviolet-curing type resin are contained in the ink according to the second aspect of the present invention at a mass ratio (reactive curing type resin/ultraviolet-curing type resin) of not less than 1/1, preferably not less than 2/1. The upper limit of this ratio is 10/1, preferably 8/1. If the mass ratio is less than 1/1, stated otherwise, if the proportion of the reactive curing type resin is smaller than required, the proportion of the ultraviolet-curing type resin is too large and, hence, the resulting ink will yield a mark having lowered impact resistance. On the other hand, if it is more than 10/1, stated otherwise, if the proportion of the reactive curing type resin is larger than required, it takes a longer time for the ink to cure due to the ultraviolet-curing type resin used in a relatively small proportion and, hence, a resulting mark may be blurred when a clear paint is applied after irradiation of ultraviolet ray according to the manufacturing method of the present invention to be described later, thus marring the appearance of the mark. To prevent the mark from blurring, it is necessary to provide a longer drying time between the mark printing process and the clear paint applying process, resulting in no improvement in the productivity.

Like the ink according to the first aspect of the present invention, the ink according to the second aspect of the present invention preferably further contains a photopolymerization initiator. As required, the ink may further contain additives as exemplified with respect to the ink according to the first aspect.

The ink according to the second aspect may be prepared by mixing the foregoing ingredients individually or by mixing a commercially-available two-part curing type ink and an ultraviolet-curing type ink at an appropriate ratio and optionally adding a reinforcing agent and other additives to the resulting mixture as required. The reinforcing agent reacts with the base resin contained in the reactive curing type resin to facilitate the curing reaction. In the case where the reactive curing type resin is a polyurethane resin, polyamine compounds can be used as the reinforcing agent.

The golf ball printing ink thus constituted according to the present invention is used for printing on a golf ball body surface.

A golf ball manufacturing method according to the present invention comprises the steps of printing a mark on a ball body with use of the ink of the present invention, irradiating the mark with ultraviolet ray after the printing, and applying a clear paint to the ball body so as to cover the ball body and the mark after the ultraviolet ray irradiation.

Golf ball bodies to which the golf ball manufacturing method of the present invention is applicable include, without any particular limitation, a one-piece golf ball body; a multi-piece golf ball body comprising a core and a cover covering the core; and a wound-core golf ball body comprising a wound core and a cover covering the core. The one-piece golf ball body comprises a spherical body formed of a vulcanized rubber. The core and the cover of the multi-piece golf ball body each comprise at least a single layer. The wound-core golf ball body is formed by winding rubber thread around a liquid center or a solid center and covering the wound core with a cover comprising at least a single layer.

The material of the core forming part of the ball body is not particularly limited. The material of the cover may be a natural material such as balata, a synthetic resin such as ionomer, elastomer, or a blend thereof, or polyurethane. A cover material containing an ionomer is preferred because ionomers, which generally have a carboxyl group, have superior affinity with the paint used in the present invention and hence are highly effective in improving the adhesion between the ball body and the paint.

Such a ball body may be subjected to any surface-roughening treatment known to those skilled in the art such as sandblasting, shot blasting, or buffing. Such a surface-roughening treatment physically contributes to improvements in the adhesion between the ink and the ball body and between the coating film and the ball body.

A pad printing process is preferably employed as a printing process used in the invention.

After the printing of a mark, the mark is first irradiated with ultraviolet ray to cause the ultraviolet-curing type resin contained therein to cure so that the mark becomes no longer tacky when touched with a finger or the like.

A commercially available mercury lamp, arc lamp or xenon lamp can be used as an ultraviolet ray source.

The ultraviolet ray irradiation time is about 0.3 to 3 seconds. Crosslinking cure of the ultraviolet-curing type resin terminates through ultraviolet ray irradiation. Accordingly, even when the ink is in a state where the evaporation of the solvent in the case of the ink according to the first aspect hardly proceeds or the reactive cure of the ink according to the second aspect hardly proceeds, the ink is no longer tacky when touched with a finger. Unlike the conventional practice in which golf balls are left stationary over day and night after printing, the ink of the present invention does not require balls to be left stationary after printing and allows coating of a golf ball body with a clear paint after the ultraviolet ray irradiation without causing the mark to be blurred by the clear paint.

After the ultraviolet ray irradiation, application of the clear paint is performed so as to cover the ball body and the mark. The clear paint serves to protect the mark as well as to improve the appearance of the ball.

Any conventional clear paint used in the art of golf ball manufacturing is usable as the clear paint. Specifically, a two-part curing type urethane paint comprising a polyol and a polyisocyanate are preferably used. Though such polyol and polyisocyanate are usually used as dissolved in solvents, the mark printed on a golf ball body is prevented from dissolving in these solvents or from swelling because the curing of the ultraviolet-curing type resin constituting the mark has been completed before the application of the clear paint.

A golf ball according to the present invention comprises a mark printed on a surface of a golf ball body with use of the ink of the present invention, and a coating film of a clear paint covering the golf ball body surface and the mark. Specifically, the golf ball of the present invention is manufactured according to the foregoing manufacturing method of the present invention.

EXAMPLES

The present invention will be described more specifically by way of examples, which should not be construed to limit the scope of the present invention.

Evaluation Method

1. Impact Resistance

Using a swing machine manufactured by True Temper Co. Ltd., each ball was hit 100 times with a #1 driver at a head speed of 45 m/S. The mark of each ball thus hit was visually observed to check the degree of peeling, and was rated into the following four ranks according to the degree of peeling.

Rank "⊙": a mark not peeled;
Rank "○": a mark having a total peeled area of less than 1 $mm^2$;
Rank "Δ": a mark having a total peeled area of not less than 1 $mm^2$ and less than 2 $mm^2$; and
Rank "X": a mark having a total peeled area of not less than 2 $mm^2$.

2. Solvent Resistance

A scratch test was conducted for finished golf balls. A scratched portion of the mark of each ball was observed to check the degree of blur of the mark. If the mark is insufficiently cured, the solvent oozing out of the ink is observed as blur.

The mark of each ball was rated into the following four ranks according to the degree of blur.

Rank "⊙": a mark not blurred;
Rank "○": a mark slightly blurred but involving no practical problem;
Rank "Δ": a mark blurred to a medium degree; and
Rank "X": a mark largely blurred.

Preparation of Ink

1. Ink according to the first aspect of the present invention

An evaporation to dryness type ink produced by NABITAS CO. under the trade name: PAD PLH (black) and an ultraviolet-curing type ink produced by NABITAS CO. under the trade name: PJU-S were mixed together at a ratio shown in Table 1, to prepare an ink according to the first aspect of the present invention.

It should be noted that the ink named "PJU-S" contains a radical-polymerizable monomer and a photopolymerization initiator in addition to an ultraviolet-curing type resin.

2. Ink according to the second aspect of the present invention

A two-part curing type ink produced by NABITAS CO. under the trade name: PAD EPH and the ultraviolet-curing type ink produced by NABITAS CO. under the trade name: PJU-S were mixed together at a ratio shown in Table 2, to prepare an ink according to the second aspect of the present invention.

Manufacture of Golf Ball

1. Ball Body

A golf ball body comprising a vulcanized rubber core having a diameter of 38.3 mm and an ionomer cover covering the core was used.

2. Printing of Mark

Using each of the inks prepared as above, a mark was printed on a surface of each golf ball body by pad printing, followed by irradiation of ultraviolet ray for six seconds under the condition of 120 W/cm by means of a metal halide lamp.

3. Clear Paint

After the irradiation of ultraviolet ray, a urethane-type clear paint was applied to the entire surface of each ball body so as to cover the mark. After the application of the clear paint, the ball was dried at 50° C. for 24 hours to complete the manufacture of golf balls.

The golf balls thus finished were evaluated as to their impact resistance and solvent resistance according to the evaluation methods described above. The results of the evaluation are shown in Tables 1 and 2.

The mixing ratio shown in Table 1 represents solid resin:ultraviolet-curing type resin, while the mixing ratio shown in Table 2 represents reactive curing type resin:ultraviolet-curing type resin.

TABLE 1

| No. | 1-1 | 1-2 | 1-3 | 1-4 | 1-5 | 1-6 | 1-7 | 1-8 | 1-9 | 1-10 | 1-11 | 1-12 |
|---|---|---|---|---|---|---|---|---|---|---|---|---|
| Mixing Ratio | 1:0 | 20:1 | 15:1 | 10:1 | 8:1 | 5:1 | 3:1 | 2:1 | 1:1 | 1:3 | 1:5 | 0:1 |
| Impact Resistance | ⊚ | ⊚ | ⊚ | ⊚ | ⊚ | ⊚ | ⊚ | ⊚ | ○ | △ | X | X |
| Solvent Resistance | X | X | △ | ○ | ⊚ | ⊚ | ⊚ | ⊚ | ⊚ | ⊚ | ⊚ | ⊚ |

TABLE 2

| No. | 2-1 | 2-2 | 2-3 | 2-4 | 2-5 | 2-6 | 2-7 | 2-8 | 2-9 | 2-10 | 2-11 | 2-12 |
|---|---|---|---|---|---|---|---|---|---|---|---|---|
| Mixing Ratio | 1:0 | 20:1 | 15:1 | 10:1 | 8:1 | 5:1 | 3:1 | 2:1 | 1:1 | 1:3 | 1:5 | 0:1 |
| Impact Resistance | ⊚ | ⊚ | ⊚ | ⊚ | ⊚ | ⊚ | ⊚ | ⊚ | ○ | △ | X | X |
| Solvent Resistance | X | X | △ | ○ | ⊚ | ⊚ | ⊚ | ⊚ | ⊚ | ⊚ | ⊚ | ⊚ |

In either case of Tables 1 and 2, when the proportion of the ultraviolet-curing type resin was small, the solvent resistance was inferior (see Nos. 1-1 to 1-3 and 2-1 to 2-3), whereas when the proportion of the solid resin or the reactive curing type resin was small, the impact resistance was inferior (see Nos. 1-12, 1-13, 2-11 and 2-12).

When the mixing ratio of solid resin:ultraviolet-curing type resin or of reactive curing type resin:ultraviolet-curing type resin was within the range between 0:1 and 1:1, the solvent resistance and the impact resistance were both satisfactory. These properties were particularly superior when the mixing ratio was within the range between 8:1 and 2:1.

The golf ball printing ink of the present invention uses a mixture of the ultraviolet-curing type resin and the solid resin or reactive curing type resin as a vehicle and hence requires a shortened drying time after printing while enabling printing of a mark having superior durability.

Accordingly, use of the ink of the present invention allows the productivity of golf balls to be enhanced without impairing the clear appearance of a mark printed on each golf ball.

This application is based on Japanese Patent Application Ser. No. 2000-272851 filed in Japanese Patent Office on Sep. 8, 2000, the contents of which are hereby incorporated by reference.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A golf ball printing ink comprising a solvent, a two-component reactive resin including a base resin and a curing agent, and an ultraviolet curable resin.

2. A golf ball printing ink according to claim 1, wherein the two-component reactive resin is curable through reaction with a curing agent.

3. A golf ball printing ink according to claim 1, wherein the two-component reactive resin and the ultraviolet-curing type resin are contained at a mass ratio (two-component reactive resin: ultraviolet curable resin) ranging between 1:1 and 10:1.

4. A golf ball printing ink according to claim 1, wherein the curing agent is an isocyanate compound.

5. A golf ball printing ink according to claim 1, wherein the base resin is a polyol.

6. A golf ball printing ink according to claim 1, wherein the ultraviolet curable resin is a member selected from the group consisting of epoxy resins and polyurethanes having an ultraviolet ray reactive (meth)acryloyl group, unsaturated polyesters, and alkyd resins.

7. A golf ball printing ink according to claim 1, wherein the ultraviolet curable resin further comprises a radical-polymerizable monomer selected from the group consisting of a vinyl compound and an unsaturated monobasic acid.

8. A golf ball printing ink according to claim 7, wherein the radical polymerizable monomer is selected from the group consisting of styrene, acrylic acid, methacrylic acid, crotonic acid and cinnamic acid.

9. A golf ball printing ink according to claim 1, which further comprises a photopolymerization initiator which enhances curing efficiency of the ultraviolet curable resin upon irradiation with an ultraviolet ray.

10. A golf ball printing ink according to claim 1, further comprising a polyamine compound as a reinforcing agent.

11. A golf ball printing ink according to claim 1, wherein the curing agent is an isocyanate compound; the base resin is a polyol; and the ultraviolet curable resin is a member selected from the group consisting of epoxy resins and polyurethanes having an ultraviolet ray reactive (meth)acryloyl group, unsaturated polyesters, and alkyd acid.

12. A golf ball printing ink comprising a solvent, a reactive resin which is curable through reaction with an isocyanate compound as a curing agent, and an ultraviolet curable resin.

13. A golf ball printing ink according to claim 12, wherein the reactive resin and the ultraviolet curable resin are contained at a mass ratio (reactive curing type resin: ultraviolet curable resin) ranging between 1:1 and 10:1.

14. A golf ball printing ink according to claim 12, wherein the ultraviolet curable resin is a member selected from the group consisting of epoxy resins and polyurethanes having an ultraviolet ray reactive (meth)acryloyl group, unsaturated polyesters, and alkyd resins.

15. A golf ball printing ink according to claim 12, wherein the ultraviolet curable resin further comprises a radical-polymerizable monomer selected from the group consisting of a vinyl compound and an unsaturated monobasic acid.

16. A golf ball printing ink according to claim 15, wherein the radical polymerizable monomer is selected from the group consisting of styrene, acrylic acid, methacrylic acid, crotonic acid and cinnamic acid.

17. A golf ball printing ink according to claim 12, which further comprises a photopolymerization initiator which enhances curing efficiency of the ultraviolet curable resin upon irradiation with ultraviolet ray.

18. A golf ball printing ink according to claim 12, further comprising a reinforcing agent.

19. A golf ball printing ink according to claim 12, further comprising a polyamine compound as a reinforcing agent.

20. A golf ball printing ink comprising;
   a solvent,
   a polyol base resin,
   an isocyanate compound for curing the polyol base resin, and
   an ultraviolet curable resin having an unsaturated bonds,
   wherein a mass ratio of the polyol base resin with the isocyanate compound to the ultraviolet curable resin is ranging between 1:1 and 10:1.

21. A golf ball printing ink according to claim 20, wherein the ultraviolet curable resin is a member selected from the group consisting of epoxy resins and polyurethanes having an ultraviolet ray reactive (meth)acryloyl group, unsaturated polyesters, and alkyd resins.

22. A golf ball printing ink according to claim 20, wherein the ultraviolet curable resin further comprises a radical-polymerizable monomer selected from the group consisting of vinyl compound and unsaturated monobasic acids.

23. A golf ball printing ink according to claim 22, wherein the radical polymerizable monomer is selected from the group consisting of styrene, acrylic acid, methacrylic acid, crotonic acid and cinnamic acid.

24. A golf ball printing ink according to claim 20, which further comprises a photopolymerization initiator which enhances curing efficiency of the ultraviolet curable resin upon irradiation with ultraviolet ray.

25. A golf ball printing ink according to claim 20, which further comprises a polyamine compound capable of crosslinking with the base resin as a reinforcing agent.

26. A method of manufacturing a golf ball, comprising the steps of:
   printing a mark on a surface of a golf ball body with use of the ink of claim 1;
   irradiating the mark with ultraviolet ray after the printing; and
   applying a clear paint to the golf ball body after the ultraviolet ray irradiation.

27. A golf ball comprising a ball body, a mark printed on a surface of the ball body with use of the ink claim 1, and a coating film of a clear paint covering a surface of the ball body and the mark.

\* \* \* \* \*